United States Patent [19]

Horvath et al.

[11] Patent Number: 4,707,027
[45] Date of Patent: Nov. 17, 1987

[54] PNEUMATICALLY CUSHIONED VEHICLE SEAT(S) AND APPARATUS AND METHOD TO ADJUST THE SAME

[75] Inventors: Zoltan L. Horvath, Birmingham; Gary A. Kavanagh, Roseville; Steven F. Manning, Novi; Ronald J. Pyszel, Sterling Heights; Lloyd W. Rogers, Utica; Edgar H. Schlaps, Washington, all of Mich.

[73] Assignee: General Motors Corporation, Detroit, Mich.

[21] Appl. No.: 834,425

[22] Filed: Feb. 28, 1986

[51] Int. Cl.⁴ .............................................. A47C 3/00
[52] U.S. Cl. .................................... 297/284; 297/460; 297/DIG. 3
[58] Field of Search ................. 297/284, DIG. 3, 460

[56] References Cited

U.S. PATENT DOCUMENTS

| | | | |
|---|---|---|---|
| 4,321,044 | 3/1982 | Kron | 297/284 |
| 4,570,676 | 2/1986 | Nishio et al. | 297/284 |
| 4,589,695 | 5/1986 | Isono | 297/284 |
| 4,592,588 | 6/1986 | Isono et al. | 297/284 |

Primary Examiner—Francis K. Zugel
Attorney, Agent, or Firm—Ernest E. Helms

[57] ABSTRACT

A pneumatically cushioned vehicle seat and apparatus and method to adjust the same is provided by the present invention. A novel switching and pumping arrangement for the pneumatic seat and/or seating combination allows the pump to inflate the pneumatic cushion and also deflate the pneumatic cushion. Use of the pump for deflation of the pneumatic cushion eliminates the need of the chair occupant pushing against the same cushion when adjusting the seat to a less firm position.

6 Claims, 5 Drawing Figures

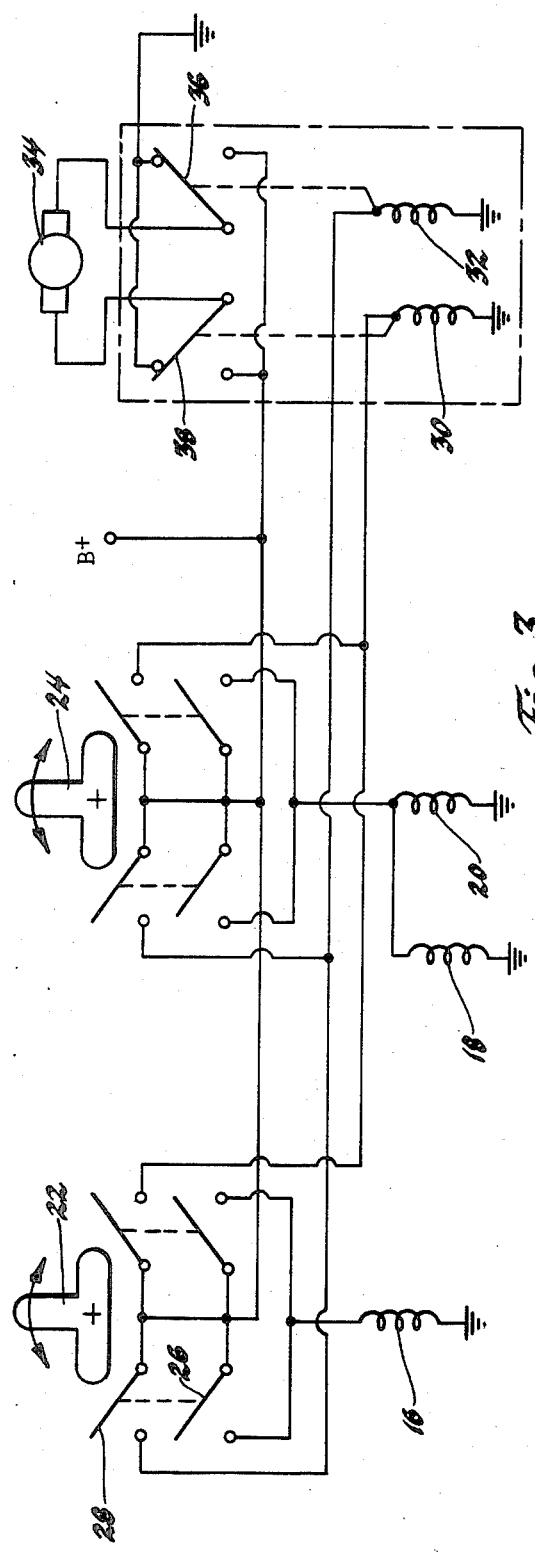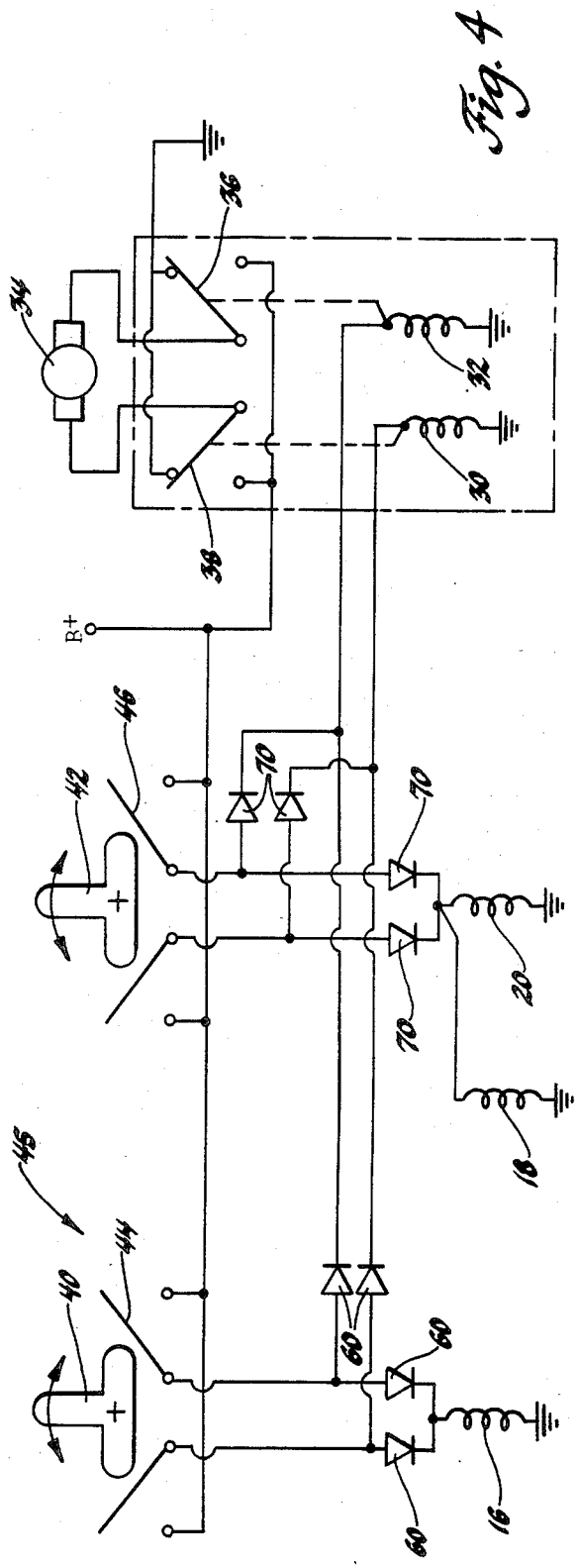

PNEUMATICALLY CUSHIONED VEHICLE SEAT(S) AND APPARATUS AND METHOD TO ADJUST THE SAME

FIELD OF THE INVENTION

The present invention relates to vehicle seats with an adjustable pneumatic cushion (sometimes referred to as bladders). More particularly the present invention relates to vehicle seats with adjustable pneumatic cushions powered by an on board motorized air supply. The present invention also relates to vehicle with a plurality of seats with adjustable pneumatic cushions.

DISCLOSURE STATEMENT

It is known in the art to provide vehicle seats with attached pneumatic cushions to increase driver comfort. It is also well known in the art to provide pneumatic cushions which may be adjusted to a desired firmness by adding air from a vehicle borne artificially powered air supply. An example of the above is shown in Vanderbilt et al U.S. Pat. No. 3,326,601.

Vanderbilt et al, is limited in that to deflate the seat cushion, the cushion must be vented to the atmosphere. Because the seat is deflated by simply venting the cushion to the atmosphere, the vehicle operator must push against the cushion to deflate it. The required push is often inconvenient due to the fact that many cushions are prefilled with a porous foam material. It is especially inconvenient for the vehicle occupant to push against the seat to deflate the air cushion when the air cushion is used in a head rest area.

SUMMARY OF THE INVENTION

To overcome the above noted and other problems the present invention is brought forth. The present invention is a vehicle seat having adjustable pneumatic bladders and an arrangement and method to control the inflation or deflation of the bladders. In the preferred embodiment, the present invention provides a vehicle seat having a pneumatic bladder selectively connected with a reversible pump via a solenoid valve. The present invention allows the seat occupant to selectively add pressurized air to the pneumatic bladder, or if desired decrease the firmness of the bladder by allowing the pump to create a vacuum, thereby removing air from the bladder. No force is required by the seat occupant to evacuate the air from the bladder. The seat occupant is freed from the requirement of pushing against the pneumatic cushion to remove the air from the same.

A particular object of the present invention is to provide a vehicle seat with attached pneumatic cushions with valving means for selective fluid communication of the pneumatic cushions with a means of powered inflation and deflation.

It is another particular object of the present invention to provide a switching and pumping arrangement for a vehicle seat having a pneumatic cushion by use of a valving means selectively controlling fluid communication with the cushions, powered inflation and deflation means for filling and evacuating the cushions and switching means for controlling the valving means and the powered inflation and deflation means.

It is also another particular object of the present invention to provide a method of adjusting a vehicle seat pneumatic cushion by opening a valve to allow fluid communication between the cushion and the pump, pumping air into the cushion, closing the valve to prevent fluid communication with the pump, opening the valve to allow fluid communication with the pump and pumping air from the cushion.

It is yet another object of the present invention to provide a switching and pumping arrangement for a vehicle seat having a pneumatic cushion as heretofore described also having pressure regulator means to protect the pneumatic bladder. It is yet still another object of the present invention to provide a vehicle seat switching and pumping arrangement as heretofore described wherein the vehicle has two separate seats.

It is still yet another object of the present invention to provide a vehicle pneumatic seat combination having at least two seats including at least two pneumatic cushions attached with each seat, an individual and separate valving means for at least two of the pneumatic cushions of each seat for selectively allowing fluid communication with the seat cushions, a common powered inflation-deflation means for filling and evacuating the cushions, and manually activated switching means for controlling the valving means and the powered inflation-deflation means having a mode to control each said seat, and cushion pressure regulator means to cut off the powered inflation-deflation means and to close the valving means in response to the pressure in a cushion and to prevent reactivation of said powered inflation-deflation means until said switching means is deactivated and clear means for evacuating said pneumatic cushions of an individual seat independent of the mode of the switching means.

Other objects and advantages of the present invention will become more apparent to those skilled in the art as the nature of the invention is better understood from the accompanying drawings and a detailed description.

BRIEF DESCRIPTION OF THE DRAWINGS

FIG. 3 is a schematic diagram of the switching arrangement of a preferred embodiment of the present invention;

FIG. 4 is a schematic diagram of an alternative preferred embodiment of the switching system of the present invention.

DETAILED DESCRIPTION OF THE DRAWINGS

Figure 1:
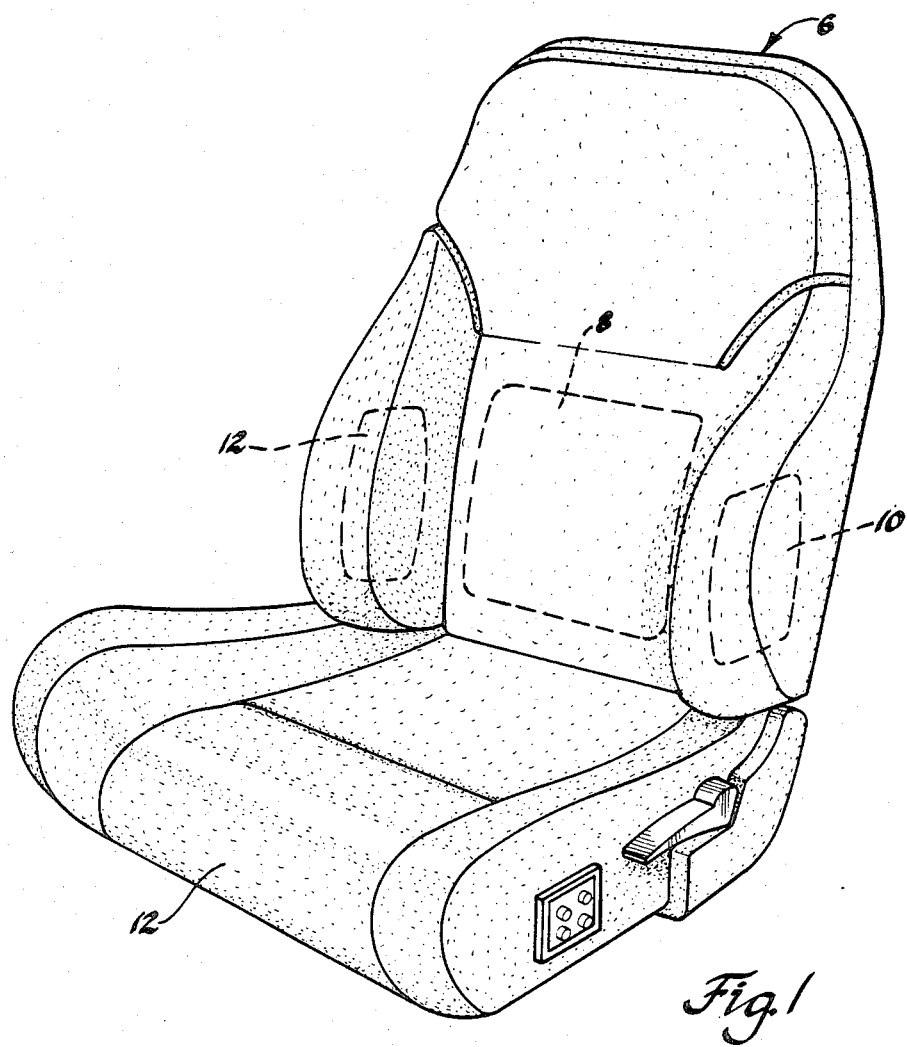
FIG. 1 is a perspective view of a vehicle seat of the present invention.
Figure 2:
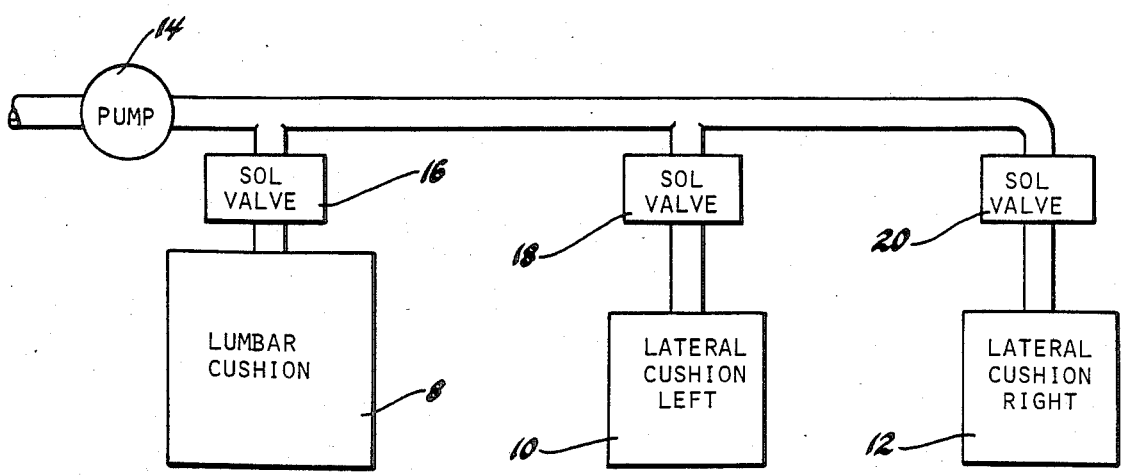
FIG. 2 is a schematic diagram of the pneumatic system of the present invention.

Referring to FIGS. 1 and 2, the vehicle seat 6 of the present invention is comprised of several elements. Element one, the vehicle seat 6 has attached thereto internally or externally a lumbar pneumatic bladder or cushion 8 and lateral pneumatic cushions 10 and 12.

Pneumatically connected with the cushions is an artificially powered reversible air pump 14. Between the air pump 14 and the pneumatic cushions 8, 10, and 12 are valves 16, 18 and 20 respectively. The valves allow for selective fluid communication between the cushions and the air pump 14. Typically valves 16, 18 and 20 will be solenoid activated valves biased in the shut or closed position.

If desired, pump 14 can be a vane pump. Also pump 14 can be replaced by one pump for inflation and one pump for deflation.

Referring to FIG. 3, the switching arrangement of the present invention has two double pole double throw electrical switches 22 and 24. Switch 22 has double contacts 28 and 26. Contact 28 activates the operation of the reversible pump motor 34 relays 30 and 32. Contact 26 activates solenoid 16 which controls the lumbar cushion. It is usually desirable for switch 22 to be biased in a neutral position. The first switch biased in a neutral position is utilized for controlling the lumbar bladder.

The switch 24 operates in a similar fashion as does switch 22 except that it is used for simultaneously controlling both the left and right lateral cushion solenoid valves 18 and 20.

In operation, displacing switch 22 in a counterclockwise direction, activates lumbar solenoid valve 16 and simultaneously activates the relay 32 to start pump reversible motor 34. Activation of relay 32 causes contact 36 to make contact with the voltage supply and pump 14 will begin to fill lumbar cushion 16. When the lumbar cushion 8 reaches a desired inflation, the operator releases switch 22 and solenoid valve 16 and pump motor relay 32 are deactivated. If the operator fails to discontinue the filling operation, there is provided means for venting any excess air to the atmosphere to prevent damage to the cushion bladder.

When it is desired to release air from the lumbar cushion 16 the switch will be rotated in a clockwise direction thereby again opening up solenoid valve 16 and simultaneously starting reversible motor 34 in the opposite direction via relay 30 and contact 38. In like manner, switch 24 controls the operation of the two lateral bladders through solenoid valves 18 and 20. If desired, the lateral bladders 10 and 12 could be pneumatically connected and only one solenoid valve would be required.

Referring to FIG. 4, an alternative arrangement 45 of the switching system is provided utilizing double pole, single throw switches 40 and 42 with single contacts 44 and 46. To eliminate the need for double contacts, diode banks 60 and 70 are added. The operation of arrangement 38 is identical to that shown in FIG. 3.

Figure 5:
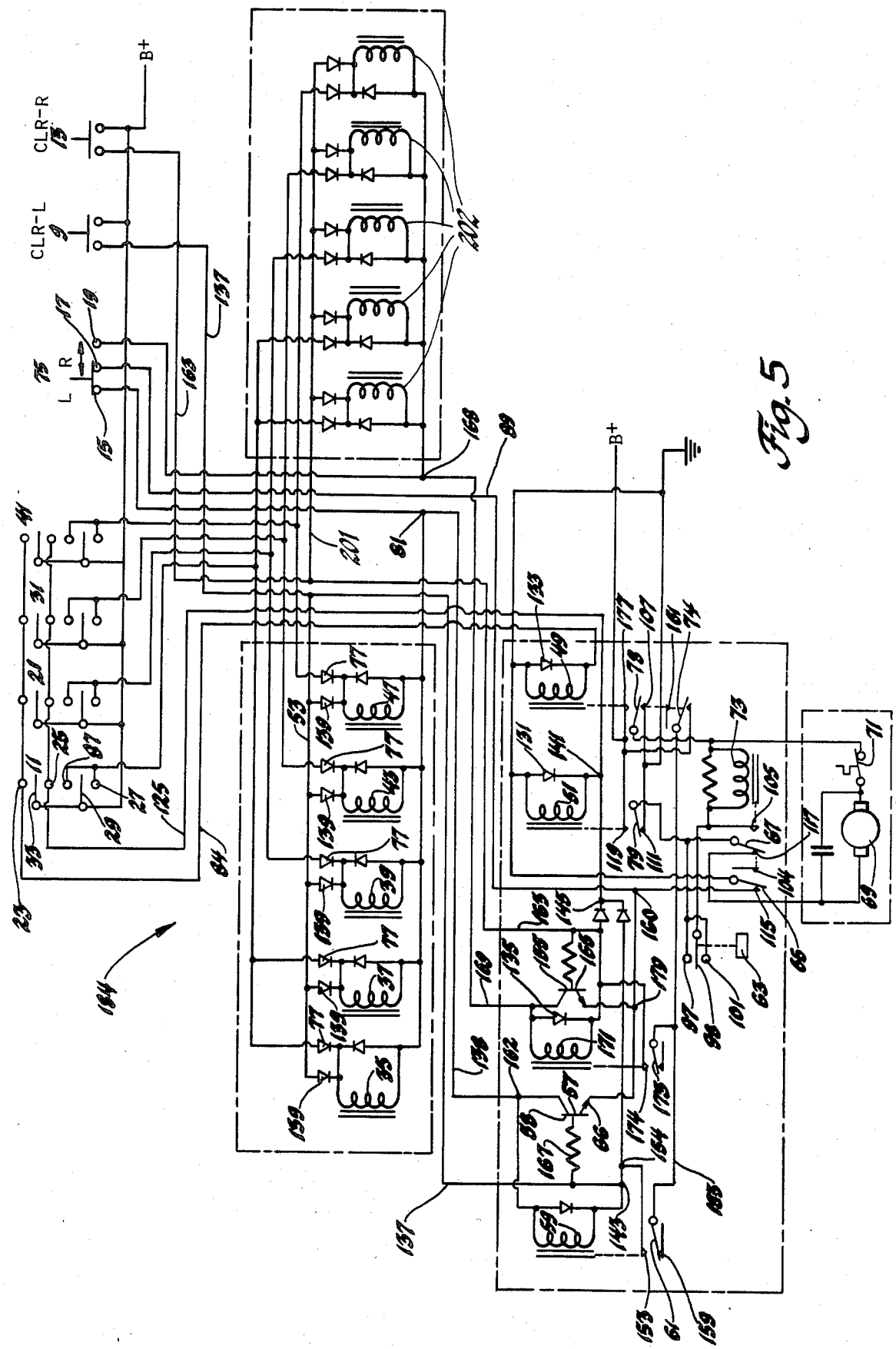
FIG. 5 is a schematic diagram of an alternative preferred embodiment of the switching system of the present invention used with a combination of seats.

Referring to FIG. 5, there is provided a switching and pumping arrangement 184 for a car having a combination of vehicle seats according to the present invention. As illustrated, the two seats designated left and right share a common set of normally open, accessible to the seat occupant cushion adjustment selector switches 11, 21, 31, and 41.

The left-right mode switch 75 permits the seating combination to share a common set of selector switches. When it is desired to adjust the left seat, the mode switch 75 will be placed on electrical contacts 15 and 17. To operate the right seat, mode switch 75 will be moved to a position over contacts 17 and 19. Contact 17 provides a common ground for contacts 15 and 19 via line 89, contact 115, and relay wiper 65.

Selector switch 41 controls cushion solenoid (valve) coil 47, selector switch 31 controls solenoid coil 43, selector switch 21 controls solenoid coil 39 and selector switch 11 controls the separate solenoid valve coils 37 and 35 respectively of two separate cushions. Each cushion has its own individual solenoid valve in order to provide pneumatic isolation between the cushions.

When it is desired to inflate the pneumatic cushion which is connected with the solenoid valve controlled by coil 37, the double pole, double throw, double contact selector switch 11 is raised upward. The above will cause relay wiper 29 to make contact with contact 87 electrically connecting contact 27 with battery positive (B+). Current will then flow through diodes 77 then through relay coils 37 and 35 thereby activating the solenoid valves to the open position. The connection to ground is made via junction 81 back up to connected leads 15 and 17 of the mode switch 75.

For activation of pump reversible motor 69 for inflation, selector switch 11 has relay wiper 33 which makes contact with contact 23, connecting contact 23 with B+. Current will then flow through line 84 to relay coil 49. Relay coil 49 causes relay 78 to leave contact 107 and connect with B+ via contact 177 thereby connecting motor 69 via circuit breaker 71 with current. Motor 69 is contacted via normally closed relay 67 with relay 79. Relay 79 in contact with contact 111 connects the relay 67 with ground. The motor 69 will continue to inflate a pneumatic cushion until selector switch 11 is released by the vehicle operator.

Pressure regulator switch 63 is provided to protect the cushions (bladder) from excessive inflation or deflation. Pressure switch 63 senses the air pressure within the cushions putting out a signal which controls relay wiper 98. (Note: pressure switch 63 may sense the air pressure within the cushion itself, or may indirectly sense the air pressure via an air supply manifold feeding into the cushion.)

At a predetermined pressure the relay wiper 98 will be pushed upwards by pressure switch 63 to make contact with contact 97 (connected to ground via relay wiper 79). The above will cause current to flow through relay coil 73 which controls relay wipers 67 and 65. (Note: Both relay wipers are spring biased in the position illustrated). Relay wiper 67 will be brought into contact with contact 105. When relay wiper 67 switches from contact 117 to 105 the electrical connection to motor 69 is broken and the motor stops inflation. Relay wiper 67 is now grounded via relay wiper 98 and contact 97. Therefore coil 73 will be continually energized. The effect of the above setup prevents the motor 69 from being reactivated unless the activated selector switch (one of 11, 21, 31 or 41) is returned to the neutral position to cause relay wiper 78 to return to a position of contact with contact 107.

Relay coil 73 also places relay wiper 65 in contact with lead 104 thereby open circuiting ground lead 17 of mode switch 75. With the ground open circuited, all of the solenoid valves will close. Since relay wiper 65 cannot return to contact 115 until relay coil 73 is deactivated, all of the solenoid valves to the cushions will remain in a closed position until the selector switch is deactivated.

The power shut off means is provided to prevent a reactivation of the motor just because the air pressure within the cushion has been lowered. If the reactivation of the solenoid valves and motor were possible, after power shut off, the operator could cause the motor to continue to turn on and off in response to the increasing and decreasing air pressure within the cushion. Cycling of the motor would be highly undesirable. Therefore the arrangement 184 forces the operator to release the selector switch to reactivate the solenoid valves or the motor whenever the motor has been shut off in response to a signal from the pressure switch 63.

When it is desired to lower the inflation of a pneumatic cushion associated with solenoid coils 37 and 35, selector switch 11 is moved downwards and relay wiper 29 is brought into contact with contact 27 to operate the solenoid coils 35 and 37 as previously described. The motor 69 is activated by current from relay wiper 33, via lead 25, line 125 activating the deflation coil 51 which pulls relay wiper 79 into contact with contact 119. Current then flows through motor 69 in the opposite direction as previously described, causing reversible motor 69 to rotate in the opposite direction withdrawing air from the pneumatic cushions. If selector switch 11 is held open by the operator, motor 69 will continue to operate until such a time as relay 98 is brought in contact with lead 101 by the pressure switch 63 thereby activating relay coil 73 causing relay wiper 67 to make contact with lead 105 and relay 65 to make contact with 104 thereby deactivating both the solenoid valves and the motor until such time the selector switch 11 is brought back to a neutral position. Relay coil 73 will be continually activated as long as relay coil 51 is held open.

The switching and pumping arrangement 75 also has a clear or relief function to simultaneously remove the air from all of the cushions of a given seat at the push of a single button. This clear function may be activated regardless of the position of selector mode switch 75.

To clear all of the cushions in the left seat, clear switch 9 is depressed, causing current to flow through line 137 which is electrically connected with line 53. From line 53 solenoid coils 35, 37, 39, 43 and 47 will be activated via the current flowing through diodes 139 thereby simultaneously opening up all of the solenoid valves connected with the various pneumatic cushions. The instantaneous connection to ground is from junction 81 to contacts 15 and 17.

Line 137 is also connected with deflation solenoid coil 51 via electrical junctions 143, 145, and 141, thereby activating coil 51, and relay wiper 79 to mate with contact 119 causing motor 69 to rotate in a direction to evacuate air from the cushions as previously described.

The clear function can be activated by a signal of an infinitely short duration. Activation of normally open left clear switch 9 will cause the motor 69 to continue to evacuate the cushions until the pressure switch 63 shuts off power to motor 69.

The momentary activation of clear switch 9 will cause current to flow through relay coil 59 (grounded via line 138) to activate relay wiper 61 to leave contact 159 and mate with contact 153. Clear switch 9 will also cause a biasing current to flow (via line 137) into transistor 57 base 58. The "turn on" of transistor 57 causes current to flow from junction 143 (now connected to battery positive via relay wipers 61 and 74) up coil 59 (keeping relay wiper 61 on contact 153) to ground via junction 162, transistor emitter 66 and junction 160. Junction 143 is retained at a higher voltage than transistor base 58 because of resistor 167. Therefore, transistor 57 remains "turned on". Current from junction 154 will continually feed into junction 141 to (activate coil 51) retaining motor 69 in the deflation mode. Motor 69 will continue to deflate the cushions until pressure switch 63 causes relay wiper 98 to move to a position to activate relay coil 73 to move relay wiper 65 to contact 104 (breaking motor 69 from ground).

The solenoid valves will remain open due to current from junction 143, up line 137 to line 53, through the solenoid valves to junction 81 and ground via contacts 15 and 17. The solenoid valves will be closed when relay coil 73 moves relay wiper 65 away from contact 115 to break ground of contact 17 (open circuit line 89).

The clear switch 13 for the right seat can also be activated regardless of the position of the left right selector mode switch 75. Initial activation of normally open right clear switch 13 causes current to flow through line 163 and biases base 165 of transistor 155. The biasing of transistor 155 allows current to flow from junction 168 through line 169 to ground via transistor 155 and junction 179. Motor 69 is now activated (via relay coil 51) and the left solenoid valves are activated because they are now connected to ground via line 169, transistor 155 and junction 179. After coil 171 is activated, relay wiper 173 is latched to contact 174, transistor 155 remains biased and ground for coil 171 continues through transistor 155 and junction 179. Therefore, the right seat cushions will be evacuated until pressure switch 63 deactivates the motor 69 as previously described. The right solenoid valves coils 202 will remain open from current from line 163 to line 201 to junction 168, line 169, transistor 155 and junction 179 to ground. The effect of the above switching arrangement allows the clear right switch to be activated even when the left right mode selector switch 75 is set in a position for the left seat only. The remainder of the operation of the clear right selector switch is as previously described for the left clear selector switch.

It is sometimes desirable to interrupt the clear function. This allows the seat occupant to begin to adjust the seat before all air is removed. Also it is desirable to interrupt the clear function if a vehicle occupant activates the clear switch for another occupant's seat in error.

Relay coil 49 also controls relay wiper 74. When relay coil 49 is activated, relay wiper 74 is brought into contact with lead 161. During normal operation lead 74 is insignificant. However, if a clear function has been activated, relay 74 will be pulled up to make contact with lead 161 thereby open circuiting line 185 therefore clearing the motor out of a clearing mode and deactivating solenoid coil 51. The effect of the above is that once a clear switch has been hit, the motor 69 will function to evacuate the pneumatic cushions, however hitting any of the selector switches 11, 21, 31, or 41 to the inflation modes will cut off the clear function. Therefore the operator does not have to wait until the pressure switch cuts off when all the pneumatic cushions are inflated before stopping the clear function to allow the seat to maintain its present firmness or to reinflate portions of the seat by operating separate selector switches to adjust by inflation to a desired firmness.

Diodes 131, 133 and 135 function mainly in the suppression of noise or the protection from voltage or current spikes for various elements. Diodes 139 are provided to prevent the activation of one solenoid valve from going through the system and activating the other solenoid valves through the clearing function lines.

A major advantage of the present invention as heretofore described is that a vehicle switching system can be made for one seat. By the simple addition of the solenoid valves functioning for the second seat, the left right selector mode switch, and an additional clear switch, all of the elements of the pumping and the switching control system are common for both seats. The above deletes the additional cost and expense of providing for a separate motor and switching system.

Although this combination has been described mainly for a left right seat combination, the invention is not limited to such but additional seating may be added as desired.

While a few of the embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A switching and pumping arrangement for a vehicle pneumatic seat having a pneumatic cushion selectively adjustable to a desired firmness by a seat occupant comprising:
   valving means for selectively allowing fluid communication with said cushion;
   powered inflation-deflation means for filling and evacuating said cushion;
   switching means accessible to and adjustable by said seat occupant having an activated and deactivated position for controlling said valving means and said powered inflation-deflation means;
   means for determining the pressure within said cushion and generating a signal in response thereto;
   power shut off means for deactivating said powered inflation-deflation means in response to said signal when the pressure within said cushion exceeds a maximum value or submerges below a minimum value;
   closing means for closing said valve in response to said signal means when the pressure within said valve exceeds a maximum value or falls below a minimum value; and
   means for preventing the re-activation of said powered inflation-deflation means until said manually activated switching means is deactivated.

2. A method of adjusting a vehicle seat pneumatic cushion selectively adjustable to a desired firmness by a seat occupant utilizing a pneumatic pump comprising:
   opening a valve in response to a switch activated from a neutral position, said switch being accessible to and adjustable by said seat occupant to allow fluid communication with said pneumatic cushion;
   pumping air in response to an activated switch to inflate said cushion;
   closing a valve in response to an activated switch to prevent fluid communication with said cushion;
   opening a valve in response to a switch activated from a neutral position, said switch being accessible to and adjustable by said seat occupant to allow fluid communication with said cushion;
   pumping air in response to an activated switch from said cushion to deflate said cushion;
   sensing the air pressure within said cushion;
   generating a signal in relation to the air pressure within said cushion;
   deactivating said pump in response to said signal;
   preventing further pumping after deactivating said pump until said activated switch is brought to a neutral position;
   reclosing said valve in response to said signal; and
   preventing the opening of said valve until said activated switch is brought to a neutral position.

3. A switching and pumping arrangement for a vehicle seat as described in claim 1 having a plurality of cushions, said switching and pumping arrangement further including clear means for simultaneously activating all of said valving means and said powered inflation-deflation means for simultaneously evacuating all of said cushions, and wherein said clear means includes a normally open switch that can be activated by a single signal of an infinitely short duration wherein said clear means will continue to operate after said normally open switch has returned to an open position.

4. A switching and pumping arrangement for a vehicle seat as described in claim 3 with interrupting means for interrupting said clear means by activation of one of said switch means.

5. A vehicle pneumatic seat combination having at least two seats, said combination comprising:
   at least two pneumatic cushions selectively adjustable to a desired firmness by a seat occupant attached with each said seat;
   an individual and separate valving means for at least two of the pneumatic cushions of each said seats for selectively allowing fluid communication with said seat cushions;
   powered inflation-deflation means for filling and evacuating said cushions;
   manually activated switching means accessible to and adjustable by said seat occupant for controlling said valving means and said powered inflation-deflation means having a mode to control each said seat;
   cushion pressure regulator means to cuff off said powered inflation-deflation means and to close said valving means in response to the pressure in said cushion and to prevent re-activation of said powered inflation-deflation means until said switching means is deactivated; and
   clear means for evacuating said pneumatic cushions of an individual seat independent of the mode of said switching means.

6. A vehicle pneumatic seat combination as described in claim 5 having a common powered inflation-deflation means.

* * * * *

UNITED STATES PATENT AND TRADEMARK OFFICE
CERTIFICATE OF CORRECTION

PATENT NO. : 4,707,027

DATED : November 17, 1987

INVENTOR(S) : Zoltan L. Horvath, Gary A. Kavanagh, Steven F. Manning, Ronald J. Pyszel, Lloyd W. Rogers, Edgar H. Schlaps It is certified that error appears in the above-identified patent and that said Letters Patent is hereby corrected as shown below:

Column 7, line 36 (Claim 1, line 22), "valve" should read -- cushion --.

Column 8, line 44 (Claim 5, line 17), "cuff" should read -- cut --.

Signed and Sealed this

Twenty-fourth Day of May, 1988

Attest:

DONALD J. QUIGG

Attesting Officer

Commissioner of Patents and Trademarks